US012562440B2

(12) United States Patent　　(10) Patent No.:　US 12,562,440 B2
Murata　　　　　　　　　　　　(45) Date of Patent:　Feb. 24, 2026

(54) TERMINAL FILM FOR POWER STORAGE DEVICE, AND POWER STORAGE DEVICE

(71) Applicant: TOPPAN INC., Tokyo (JP)

(72) Inventor: Koji Murata, Tokyo (JP)

(73) Assignee: TOPPAN INC., Tokyo (JP)

( * ) Notice: Subject to any disclaimer, the term of this patent is extended or adjusted under 35 U.S.C. 154(b) by 583 days.

(21) Appl. No.: 17/969,295

(22) Filed: Oct. 19, 2022

(65) Prior Publication Data

US 2023/0088682 A1　　Mar. 23, 2023

Related U.S. Application Data

(63) Continuation of application No. PCT/JP2021/015490, filed on Apr. 14, 2021.

(30) Foreign Application Priority Data

Apr. 27, 2020　(JP) ............................. JP2020-078399

(51) Int. Cl.
H01M 50/562　　(2021.01)

(52) U.S. Cl.
CPC ................................. H01M 50/562 (2021.01)

(58) Field of Classification Search
CPC ............. H01M 50/562; H01M 50/181; H01M 50/184; H01M 50/186; H01M 50/198; H01M 50/557; H01M 50/178; H01M 50/195; H01M 50/124; Y02E 60/10
See application file for complete search history.

(56) References Cited

U.S. PATENT DOCUMENTS

| | | | |
|---|---|---|---|
| 2012/0148888 A1* | 6/2012 | Yun | H01M 10/488 |
| | | | 429/82 |
| 2017/0005302 A1 | 1/2017 | Muroi | |
| 2021/0091435 A1 | 3/2021 | Muraki | |

FOREIGN PATENT DOCUMENTS

| | | | |
|---|---|---|---|
| JP | 2005-038707 A | | 2/2005 |
| JP | 2007-265989 A | | 10/2007 |
| JP | 2008-103283 A | | 5/2008 |
| JP | 2008-103288 A | | 5/2008 |
| JP | 2015179618 A | * | 10/2015 |
| JP | 2016-091939 A | | 5/2016 |
| JP | 2016197491 A | † | 11/2016 |
| JP | 2017001187 A | * | 1/2017 |

(Continued)

OTHER PUBLICATIONS

Chemistry Dictionary, [Compact Edition] Published Dec. 16, 2009, 2nd Edition, 1st Printing Publisher: Morikita Publishing Co., Ltd., pp. 820 and 1523.

(Continued)

*Primary Examiner* — Daniel S Gatewood

(74) *Attorney, Agent, or Firm* — Foley & Lardner LLP

(57) ABSTRACT

A terminal film for a power storage device configured to cover an outer peripheral surface of a part of a metal terminal of the power storage device composed of a power storage device main body and the metal terminal electrically connected to the power storage device main body. The terminal film contains a hydrogen sulfide developer that changes color upon reacting with hydrogen sulfide. The hydrogen sulfide developer contains at least one element selected from the group consisting of, for example, copper, lead, silver, manganese, nickel, cobalt, tin and cadmium.

13 Claims, 6 Drawing Sheets

(56)                          References Cited

FOREIGN PATENT DOCUMENTS

| | | | |
|---|---|---|---|
| JP | 2019029305 A | * | 2/2019 |
| WO | WO-2015/141772 A1 | | 9/2015 |
| WO | WO-2020/004412 A1 | | 1/2020 |

OTHER PUBLICATIONS

Wikipedia, "Copper sulfide", retrieved from the Internet: https://ja.wikipedia.org/w/index.php?title=MW%20i%20&oldid=83941856, last edited on Jun. 9, 2021, 1 page.
Wikipedia, "Yellow lead", retrieved from the Internet: https://ja.wikipedia.org/w/index.php?title=jijiB&oldid=98355788, last edited on Dec. 5, 2023, pp. 1-2.
Wikipedia, "Zinc oxide", retrieved from the Internet: https://ja.wikipedia.org/w/index.php?title=IDHt;geiB&oldid=%20101045219, last edited on Jul. 11, 2024, pp. 1-4.
European Extended Search Report issued in corresponding European Patent Application No. 21797326.2 dated Sep. 16, 2024 (7 pages).
Third Party Observation issued in corresponding Korean Patent Application No. 10-2022-7040163 dated Jul. 2, 2025.

\* cited by examiner
† cited by third party

TERMINAL FILM FOR POWER STORAGE DEVICE, AND POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/015490, filed on Apr. 14, 2021, which in turn claims the benefit of JP 2020-078399, filed Apr. 27, 2020 the disclosures of all which are incorporated herein by reference in its entirety.

TECHNICAL FIELD

The present disclosure relates to a resin film for terminals of a power storage device having a power storage device main body and terminals electrically connected to the power storage device main body, the resin film being configured to cover an outer peripheral surface of a part of the terminals, and relates to a power storage device using the resin film for terminals.

BACKGROUND

Known power storage devices include secondary batteries such as lithium-ion batteries, nickel hydride batteries and lead batteries, and electrochemical capacitors such as electric double layer capacitors. In particular, attention is being given to lithium-ion batteries for their high energy density. Metal cans that have been used for packaging materials for lithium-ion batteries are being replaced by multi-layer films due to their light weight, high heat dissipation, and low manufacturing cost.

Lithium-ion batteries using such a multi-layer film as a packaging material are called laminated lithium-ion batteries. The packaging material covers the battery contents (e.g., cathode, separator, anode, electrolyte solution) and prevents moisture from infiltrating into the battery. Laminated lithium-ion batteries are manufactured by, for example, forming a recess in part of the packaging material by cold forming, accommodating the battery contents in the recess, folding back the remaining part of the packaging material, and sealing the edge portions by heat-sealing.

The laminated lithium-ion batteries have current output terminals (sometimes also referred to as "tab leads"). For purposes such as improving adhesion between each current output terminal and the packaging material, a resin film for terminals (sometimes also referred to as a "tab sealant") may be provided to cover a part of the outer periphery of the current output terminal.

Such secondary batteries, such as lithium-ion batteries, are widely used in portable electronic devices, electric vehicles and hybrid electric vehicles powered by electricity, and the like. As lithium-ion batteries with improved safety, solid-state lithium batteries using an inorganic solid electrolyte instead of an organic solvent electrolyte are being studied. Solid-state lithium batteries are excellent in safety compared with lithium-ion batteries in that thermal runaway due to short circuit or the like is unlikely to occur.

Among the inorganic solid electrolytes, a sulfide-based solid electrolyte has a higher ionic conductance than that of an oxide-based solid electrolyte or the like, and has many advantages in obtaining a solid-state battery with higher performance. However, since solid-state batteries using a sulfide-based solid electrolyte contain sulfur, there is a risk that toxic hydrogen sulfide ($H_2S$) may be generated due to a reaction between the sulfur and moisture infiltrated into the battery. Therefore, there is a concern that hydrogen sulfide may leak out when the packaging material of the battery is damaged. In order to prevent hydrogen sulfide from leaking, PTLs 1 and 2, for example, propose a solid-state battery which is safely designed to capture and detoxify the generated hydrogen sulfide.

[Citation List] [Patent Literature] PTL 1: JP 2008-103283 A; PTL 2: JP 2008-103288 A.

SUMMARY OF THE INVENTION

Technical Problem

In a solid-state battery using a sulfide-based solid electrolyte, the generation of hydrogen sulfide means that some abnormality, such as deterioration of the sulfide-based solid electrolyte or damage to the packaging material, has occurred. For such a solid-state battery in which an abnormality has occurred, it is desired to take measures such as immediate replacement. However, since hydrogen sulfide is colorless although it has a pungent odor, it is difficult to detect generation of hydrogen sulfide. In addition, the methods described in PTLs 1 and 2 can detoxify the generated hydrogen sulfide but cannot solve the abnormality of the solid-state battery itself, which causes a delay in detection of the abnormality.

The present disclosure has been made in view of the problems of the related art described above, and has an object to provide a terminal film covering a current output terminal, the terminal film being able to detect an abnormality in a power storage device such as a solid-state battery at an early stage, and provide a power storage device using the terminal film.

Solution to Problem

In order to achieve the above object, the present disclosure provides a terminal film for a power storage device (hereinafter, also simply referred to as a "terminal film") configured to cover an outer peripheral surface of a part of a metal terminal of the power storage device composed of a power storage device main body and the metal terminal electrically connected to the power storage device main body, the terminal film containing a hydrogen sulfide developer (hereinafter, also referred to as a "first material") that changes color upon reacting with hydrogen sulfide.

According to the above terminal film for a power storage device, since the developer is contained, the terminal film containing the developer changes color when hydrogen sulfide is generated in the solid-state battery containing a sulfide-based solid electrolyte. Therefore, it is possible to visually detect when hydrogen sulfide is generated, and detect an abnormality of the solid-state battery by visual observation at an early stage.

In the above terminal film for a power storage device, the hydrogen sulfide developer may contain one or more of copper, lead, silver, manganese, nickel, cobalt, tin and cadmium. The developer containing the above elements easily changes color upon reacting with the sulfur of hydrogen sulfide, and the change in color is easily visible. Accordingly, it becomes easier to detect an abnormality of the solid-state battery by visual observation at an early stage.

In the above terminal film for a power storage device, the copper may be a material containing $CuSO_4$, the lead may be a material containing $Pb(CH_3COO)_2$, and the silver may be a material containing $Ag_2SO_4$. The hydrogen sulfide developer may be, for example, a material containing at least one compound selected from the group consisting of $CuSO_4$, $Pb(CH_3COO)_2$ and $Ag_2SO_4$. The developer containing the above compounds easily changes color upon reacting with the sulfur of hydrogen sulfide, and the change in color is easily visible. Accordingly, it becomes easier to detect an abnormality of the solid-state battery by visual observation at an early stage.

The above terminal film for a power storage device may further contain a material (hereinafter, also referred to as a "second material") that decomposes or adsorbs hydrogen sulfide. The material has at least one of decomposition capability and adsorption capability for hydrogen sulfide.

The above terminal film for a power storage device may include a layer containing both the first material and the second material, wherein a total content of the first material and the second material in the layer may be 0.01% or more and 30% or less relative to a mass of the layer. The terminal film for a power storage device may include a plurality of the above layers. That is, in the above terminal film for a power storage device, a total content of the hydrogen sulfide developer and the material that decomposes or adsorbs hydrogen sulfide in each layer may be 0.01% or more and 30% or less relative to the total mass of the layer. When the content of the developer is equal to or greater than the lower limit, the change in color is more easily visible, and when it is equal to or less than the upper limit, the functions (for example, adhesion strength and sealing strength) of the layer containing the developer can be prevented from decreasing.

In the above terminal film for a power storage device, the second material may be a material containing zinc oxide or zinc ions. The hydrogen sulfide adsorbent containing zinc oxide or zinc ions is preferred since it is excellent in capability of adsorbing or decomposing hydrogen sulfide, and is also inexpensive and easy to handle.

Advantageous Effects of the Invention

According to the present disclosure, a terminal film for a power storage device capable of detecting abnormality of a solid-state battery from the appearance at an early stage, and a solid-state battery using the same are provided.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Power Storage Device>

Figure 1:
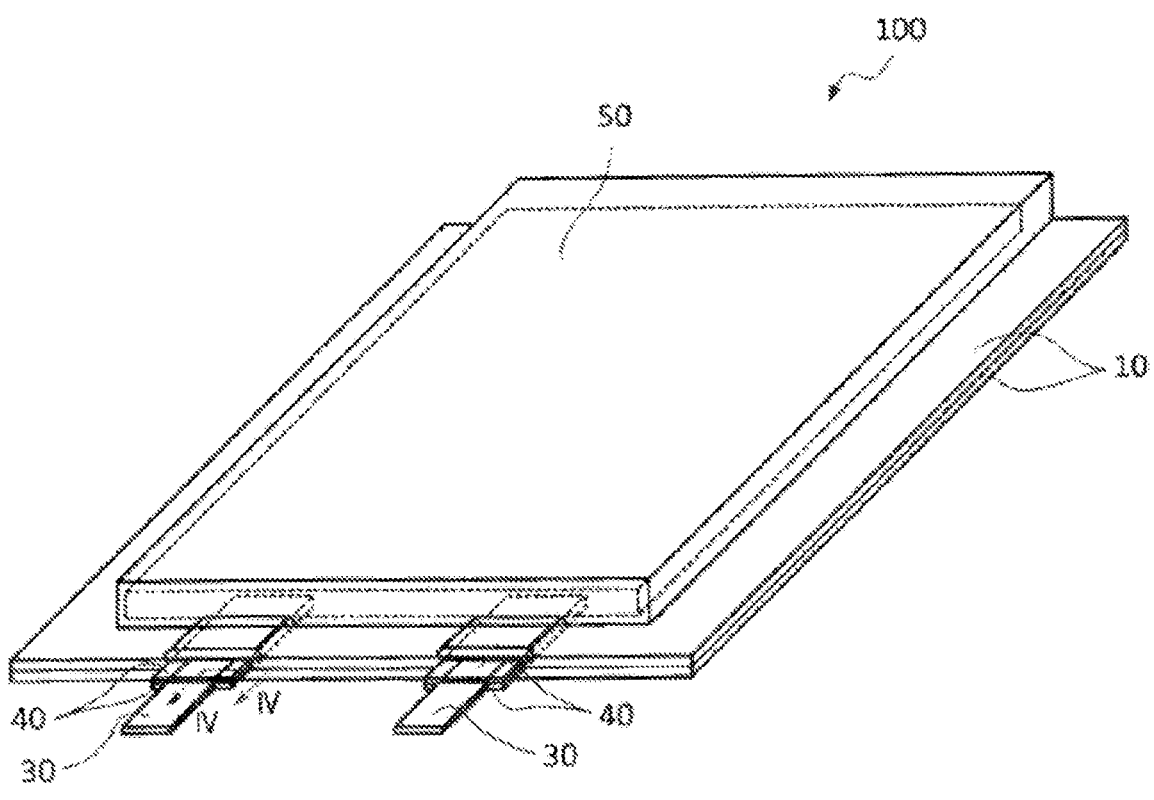
FIG. 1 is a perspective view illustrating an example of a solid-state battery.

FIG. 1 is a perspective view illustrating a schematic configuration of a power storage device according to the present embodiment. FIG. 1 shows a solid-state battery as an example of a power storage device 100. The following description will be provided by way of this example. It should be noted that a power storage device having a configuration shown in FIG. 1 may be referred to as a battery pack or a battery cell.

The power storage device 100 as a solid-state battery includes a power storage device main body 50, a packaging material 10, a pair of metal terminals 30, and a terminal film (tab sealant) 40. The power storage device main body 50 is a battery main body that performs charging and discharging. The packaging material 10 covers the surface of the power storage device main body 50 and is in contact with a part of the terminal film 40.

[Packaging Material]

Figure 2:
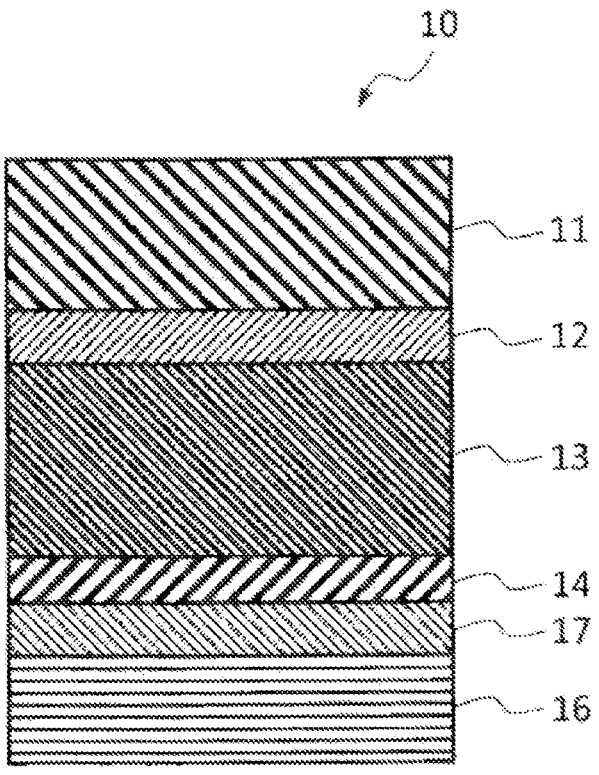
FIG. 2 is a cross-sectional view schematically illustrating an example of a power storage device packaging material.

FIG. 2 is a cross-sectional view illustrating an example of a cross section of the packaging material 10. The packaging material 10 has a multi-layer structure in which a substrate layer 11, a first adhesive layer 12, a barrier layer 13, an anticorrosion treatment layer 14, a second adhesive layer 17, and a sealant layer 16 are laminated in this order from the outer side to the inner side (power storage device main body 50 side).

(Sealant Layer)

The sealant layer 16 imparts sealing properties to the packaging material 10 due to heat-sealing. The sealant layer 16 is located on the inside of the power storage device and heat sealed when the power storage device is assembled.

The sealant layer 16 may be made of, for example, a thermoplastic resin such as polyolefin, polyamide, polyester, polycarbonate, polyphenylene ether, polyacetal, polystyrene, polyvinyl chloride, polyvinyl acetate, or the like, and preferably made of polyolefin, polyamide or polyester from the perspective of heat resistance and sealability. When the sealant layer 16 is directly laminated to the barrier layer without using an adhesive, at least one layer in contact with the barrier layer is preferably made of a material modified with an acid, glycidyl, or the like.

Examples of the polyolefin-based resin include: low density, medium density and high density polyethylenes; ethylene-α olefin copolymers; polypropylenes; and propylene-α olefin copolymers. The polyolefin resin in the form of copolymer may be a block copolymer or a random copolymer.

Examples of the polyester-based resin include polyethylene terephthalate (PET), polybutylene terephthalate (PBT), and the like. These polyester-based resins may be used singly or in combination of two or more. Further, a copolymer of any acid and glycol may be used.

In order to impart sealing properties, heat resistance and other functions, for example, antioxidants, slip agents, flame retardants, anti-blocking agents, photostabilizers, dehydrating agents, tackifiers, crystal nucleating agents, plasticizers, and the like may be added.

The peak melting temperature of the sealant layer 16 varies depending on the application. In the case of a packaging material for solid-state batteries, the peak melting temperature is preferably 160° C. to 280° C. from the perspective of improving the heat resistance.

Examples of the base resin material contained in the sealant layer 16 include polyester-based, polyolefin-based and polyamide-based resins.

The polyester-based resins can be obtained by copolymerizing an acid component and a glycol component. Examples of the acid component include phthalic acid, terephthalic acid, isophthalic acid, naphthalene dicarboxylic acid, cyclohexane dicarboxylic acid, adipic acid and sebacic acid. Examples of the glycol component include ethylene glycol, butanediol, pentanediol, hexanediol, neopentyl glycol, diethylene glycol, polytetramethylene glycol, cyclohexane dimethanol and propanediol. According to the studies by the present inventors, a general PET (copolymer of terephthalic acid and ethylene glycol) has a temperature of sub-dispersion peak γ outside the range of −130° C. to −50° C., and the sealing strength at room temperature is insufficient. When a plasticizer is not blended in the sealant layer 16, the sealant layer 16 preferably contains a polyester-based resin in which two or more glycol components are copolymerized with a single type of acid component.

Examples of the polyolefin-based resin include polyethylene and polypropylene resins. Since the polyolefin resins typically used have poor heat resistance, it is preferred to use polyethylene, polypropylene, or the like modified with an amide.

Examples of the polyamide-based resin include nylon 6 and nylon 6,6.

From the viewpoint of adjusting the temperatures at which the sub-dispersion peak γ and the main dispersion peak a of the sealant layer 16 appear, the sealant layer 16 preferably contains a plasticizer. As the plasticizer, for example, ester-based compounds can be used. Specific examples thereof include glycol diesters, adipates, phthalates, diacetyl monoacyl glycerol derivatives, and esters having an ether skeleton. Although it depends on the base resin material of the sealant layer 16, the plasticizer content in the sealant layer 16 is preferably 30 mass % or less relative to the mass of the sealant layer 16. When an excessive amount of plasticizer is blended with the sealant layer 16, the temperatures at which the sub-dispersion peak γ and the main dispersion peak a of the sealant layer 16 appear excessively decrease and the cohesive force tends to decrease.

Figures 3A, 3B, 3C:
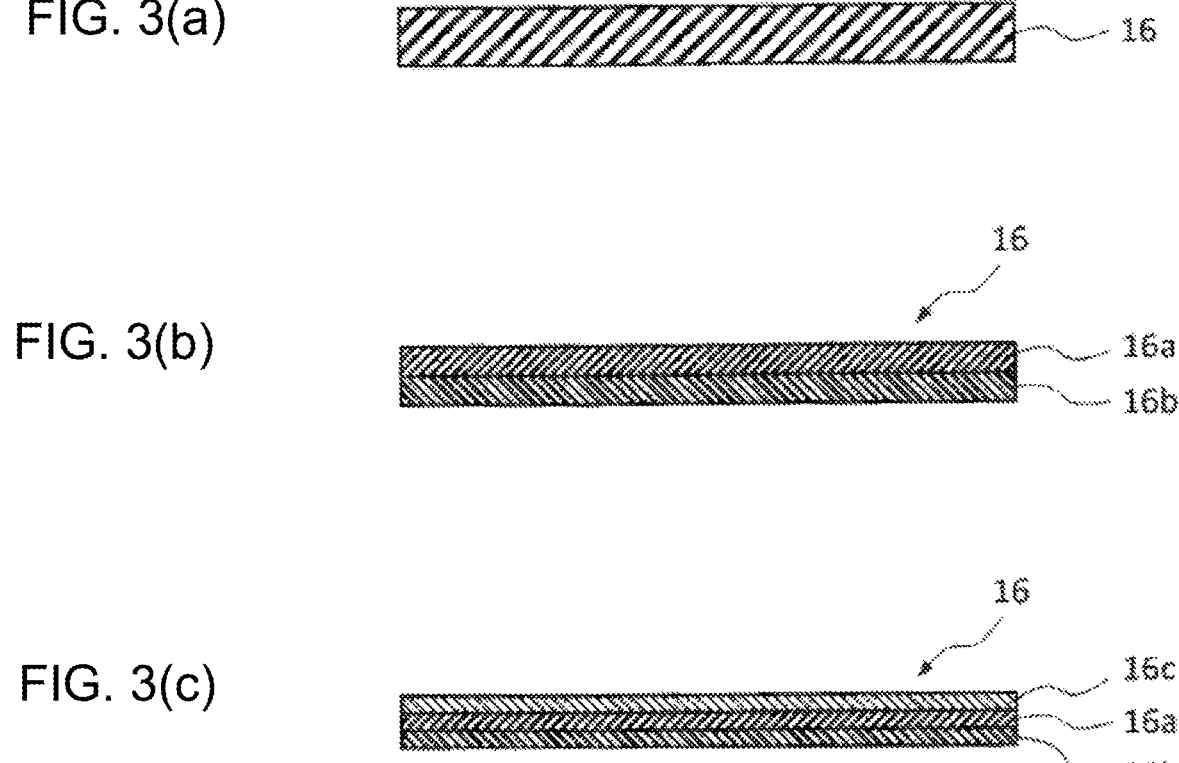
FIGS. 3(a) to 3(c) are cross-sectional views schematically illustrating a configuration of a sealant layer included in a power storage device packaging material.

The sealant layer 16 may have a monolayer structure or a multi-layer structure having two or more layers (see FIGS. 3(a) to 3(c)). The sealant layer, if it has a monolayer structure, is preferred to have a thickness of 10 μm to 300 μm, and more preferably 20 μm to 100 μm. When the sealant layer 16 has a thickness of 10 μm or more, sealing properties and insulation properties may be easily secured, and when it has a thickness of 300 μm or less, the cell volume can be secured.

FIG. 3(b) is a cross-sectional view schematically illustrating a sealant layer 16 having a two-layer structure. The sealant layer 16 shown in the figure includes a first resin layer 16a and a second resin layer 16b formed on the inner surface of the first resin layer 16a. The first resin layer 16a may be, for example, made of a material different from that of the second resin layer 16b, or may have a thickness different from that of the second resin layer 16b. The thickness of each of the first resin layer 16a and the second resin layer 16b may be, for example, 5 to 300 μm, and preferably 20 to 200 μm. As shown in FIG. 3(c), the sealant layer 16 may have a three-layer structure having a third resin layer 16c.

When the electrolyte of the solid-state battery is a sulfide-based electrolyte, the sealant layer 16 preferably contains a hydrogen sulfide adsorbent. Due to the sealant layer 16 containing a hydrogen sulfide adsorbent, it is possible to maintain excellent sealing strength at room temperature and high temperature even after exposure to hydrogen sulfide. The hydrogen sulfide adsorbent may be a material capable of adsorbing or adsorbing hydrogen sulfide. Specific examples thereof include zinc oxide, amorphous metal silicates, hydroxides of zirconium and lanthanoid elements, tetravalent metal phosphates, potassium permanganate, sodium permanganate, aluminum oxide, iron hydroxide, silver sulfate, silver acetate, isocyanate compounds, aluminum silicate, aluminum potassium sulfate, zeolites, activated carbon, amine-based compounds and ionomers.

The hydrogen sulfide adsorbent content in the sealant layer 16 is preferably 1 to 50 mass %, more preferably 2 to 25 mass %, and still more preferably 5 to 15 mass % relative to the mass of the sealant layer 16. When the hydrogen sulfide adsorbent content in the sealant layer 16 is 1 mass % or more, the sealant layer 16 can exhibit the hydrogen sulfide adsorbing effect, and when it is 50 mass % or less, the sealant layer 16 can have both the adhesion and the sealant suitability. When the sealant layer 16 has a multi-layer structure, all or part of the layers may contain a hydrogen sulfide adsorbent. Although a layer other than the sealant layer 16 (for example, the second adhesive layer 17) in the packaging material 10 may contain a sulfide-based electrolyte, it is preferred that at least the sealant layer 16 contains a hydrogen sulfide adsorbent from the viewpoint of the content of hydrogen sulfide adsorbent.

(Substrate Layer)

The substrate layer 11 imparts heat resistance to the packaging material in the sealing step during production of the power storage device, and prevents pinholes from occurring during forming processing or distribution. Particularly in the case of a packaging material for large power storage devices, the substrate layer 11 can also impart scratch resistance, chemical resistance, insulating properties, and the like.

The substrate layer 11 is preferably formed of a resin film made of a resin having insulating properties. Examples of the resin film include stretched or unstretched films such as polyester films, polyamide films, polypropylene films, polyphenylene sulfide films, and the like. The substrate layer 11 may be a monolayer film made of one of these resin films, or a laminated film made of two or more of these resin films.

Among the above resin films, the substrate layer 11 is preferably made of a polyester film or a polyamide film from the perspective of having excellent formability, and more preferably a polyamide film. These films are preferably biaxially stretched. A polyester resin constituting the polyester film may be, for example, polyethylene terephthalate. A polyamide resin constituting the polyamide film may be, for example, nylon-6, nylon-6,6, a copolymer of nylon-6 and nylon-6,6, nylon-6,10, polymetaxylylene adipamide (MXD6), nylon-11, nylon-12, or the like. Of these, nylon 6 (ONy) is preferred from the perspective of having excellent heat resistance, piercing strength and impact strength.

The stretching method used for the biaxially stretched film may be, for example, sequential biaxial stretching, tubular biaxial stretching, simultaneous biaxial stretching, or the like. From the perspective of obtaining better deep drawing formability, the biaxially stretched film is preferably stretched using a tubular biaxial stretching method.

The substrate layer 11 preferably has a thickness of 6 μm to 40 μm, and more preferably 10 μm to 30 μm. The substrate layer 11 having a thickness of 6 μm or more tends to improve pinhole resistance and insulation properties of the packaging material 10. The substrate layer 11 having a thickness of more than 40 μm tends to increase the total thickness of the packaging material 10.

(First Adhesive Layer)

The first adhesive layer 12 bonds the substrate layer 11 and the barrier layer 13. The material used for forming the first adhesive layer 12 may be specifically, for example, a polyurethane resin prepared by reacting a bifunctional or higher functional isocyanate compound with a main agent such as a polyester polyol, polyether polyol, acrylic polyol, carbonate polyol, or the like. These various polyols can be used singly or in combination of two or more, according to the functions and performance sought in the packaging material. Moreover, depending on the performance required for the adhesive, other various additives and stabilizers may be added to the polyurethane resin described above.

The thickness of the first adhesive layer 12 is not specifically limited, but may be, for example, preferably 1 μm to 10 μm, and more preferably 3 μm to 7 μm from the perspective of obtaining desired adhesive strength, followability, processability, and the like.

(Barrier Layer)

The barrier layer 13 has water vapor barrier properties to prevent moisture from infiltrating into the power storage device. Further, the barrier layer 13 has ductility and malleability for deep drawing. As the barrier layer 13, various metal foils such as an aluminum, stainless steel and copper, and a metal vapor deposition film, an inorganic oxide vapor deposition film, a carbon-containing inorganic oxide vapor deposition film, or a film having these vapor deposition films can be used. The barrier layer 13 is preferably made of a metal foil, and more preferably made of an aluminum foil from the viewpoint of the weight (specific gravity), moisture resistance, processability, and cost.

The aluminum foil may be a soft aluminum foil, particularly one subjected to an annealing treatment from the perspective of imparting desired ductility and malleability during forming, and is more preferably an iron-containing aluminum foil for the purpose of further imparting pinhole resistance, ductility and malleability during forming. The iron content in the aluminum foil is preferably 0.1 mass % to 9.0 mass %, and more preferably 0.5 mass % to 2.0 mass % relative to 100 mass % of the aluminum foil. The iron content of 0.1 mass % or more can improve pinhole resistance, ductility and malleability of a packaging material 10. The iron content of 9.0 mass % or less can improve flexibility of a packaging material 10. Although an untreated aluminum foil can be used, a degreased aluminum foil is preferably used. When the aluminum foil is degreased, only one surface of the aluminum foil may be degreased, or both surfaces may be degreased.

The thickness of the barrier layer 13 is not specifically limited, but is preferably 9 μm to 200 μm, and more preferably 15 μm to 100 μm from the perspective of barrier properties, pinhole resistance and processability.

(Anticorrosion Treatment Layer)

The anticorrosion treatment layer 14 is provided to prevent corrosion of the barrier layer 13. The anticorrosion treatment layer 14 may be formed by, for example, degreasing treatment, hydrothermal modification treatment, anodic oxidation treatment, chemical conversion treatment, or a combination of these treatments.

The degreasing treatment may be acid degreasing or alkaline degreasing. The acid degreasing may be a method using an inorganic acid such as sulfuric acid, nitric acid, hydrochloric acid or hydrofluoric acid alone or in a mixture. The acid degreasing may include use of an acid degreasing agent obtained by dissolving a fluorine-containing compound such as monosodium ammonium difluoride with the aforementioned inorganic acid. Specifically, when an aluminum foil is used as the barrier layer 13, use of this acid degreasing agent is effective in terms of corrosion resistance, for its contribution to forming a fluoride of aluminum in a passive state, in addition to obtaining the effect of degreasing aluminum. The alkaline degreasing may be a method using sodium hydroxide or the like.

The hydrothermal modification treatment may be, for example, a boehmite treatment in which an aluminum foil is immersed in boiling water to which triethanolamine has been added. The anodic oxidation treatment may be, for example, an alumite treatment.

The chemical conversion treatment may be an immersion type or a coating type. Examples of the immersion type chemical conversion treatment include chromate treatment, zirconium treatment, titanium treatment, vanadium treatment, molybdenum treatment, calcium phosphate treatment, strontium hydroxide treatment, cerium treatment, ruthenium treatment, and various chemical conversion treatments of mixed phases thereof. On the other hand, examples of the coating type chemical conversion treatment include a method of applying a coating agent having a corrosion prevention performance to the barrier layer 13.

Of these anticorrosion treatments, when any of the hydrothermal modification treatment, anodic oxidation treatment, and chemical conversion treatment is used to form at least part of the anticorrosion treatment layer, the degreasing treatment described above is preferably performed in advance. Further, when a degreased metal foil such as an annealed metal foil is used as the barrier layer 13, it is not necessary to perform degreasing treatment again in forming the anticorrosion treatment layer 14.

The coating agent used for the coating type chemical conversion treatment preferably contains trivalent chromium. Further, the coating agent may contain at least one polymer selected from the group consisting of a cationic polymer and an anionic polymer described later.

Of the treatments described above, the hydrothermal modification treatment and the anodic oxidation treatment, in particular, dissolve a surface of an aluminum foil with a treating agent to form an aluminum compound (such as boehmite or alumite) which is excellent in corrosion resistance. Since a co-continuous structure is formed from the barrier layer 13 made of an aluminum foil to the anticorrosion treatment layer 14, the above treatments are included in the definition of the chemical conversion treatment. Alternatively, the anti-corrosion treatment layer 14 can also be formed by only a pure coating method, as described below, which is not included in the definition of the chemical conversion treatment. This coating method may use, for example, a rare-earth oxide sol such as cerium oxide with a mean particle size of 100 nm or less as a material having an anticorrosion effect (inhibitor effect) for aluminum and preferable in terms of environmental aspects. Use of this method makes it possible to impart an anticorrosion effect to a metal foil such as an aluminum foil even when using an ordinary coating method.

Examples of the rare-earth oxide sol include sols using various solvents such as an aqueous solvent, an alcohol-based solvent, a hydrocarbon-based solvent, a ketone-based solvent, an ester-based solvent, an ether-based solvent, and the like. Of these sols, an aqueous sol is preferred. To stabilize dispersion, the rare-earth oxide sol may contain, as a dispersion stabilizer, an inorganic acid such as nitric acid, hydrochloric acid, phosphoric acid, or the like or a salt thereof, or an organic acid such as acetic acid, malic acid, ascorbic acid, lactic acid, or the like. Of these dispersion stabilizers, phosphoric acid, in particular, is expected to impart the packaging material 10 with features of (1) stabilizing dispersion of the sol, (2) improving adhesion to the barrier layer 13 making use of an aluminum chelate ability of phosphoric acid, and (3) improving cohesive force of the anticorrosion treatment layer 14 (oxide layer) by readily inducing dehydration condensation of phosphoric acid even at low temperature, and the like.

Since the anticorrosion treatment layer 14 formed of the rare-earth oxide sol is an aggregate of inorganic particles, the cohesive force of the layer itself may be lowered even after being dry-cured. Therefore, the anticorrosion treatment layer 14 in this case is preferably composited with an anionic polymer or a cationic polymer described below in order to supplement the cohesive force.

The anticorrosion treatment layer 14 is not limited to the layer described above. For example, the anticorrosion treatment layer may be formed using a treating agent prepared by blending phosphoric acid and a chromium compound with a resin binder (such as aminophenol) as in a coating-type chromate based on known art. When this treating agent is used, the resultant layer will have both the corrosion-preventing function and adhesion. Although it is necessary to consider stability of a coating solution, a layer having both the corrosion-preventing function and adhesion can be formed using a one-liquid type coating agent prepared in advance by mixing a rare-earth oxide sol with a polycationic polymer or a polyanionic polymer.

Regardless of having a multi-layer structure or a mono-layer structure, the anticorrosion treatment layer 14 preferably has a mass per unit area of 0.005 g/m$^2$ to 0.200 g/m$^2$, and more preferably 0.010 g/m$^2$ to 0.100 g/m$^2$. When the mass per unit area is 0.005 g/m$^2$ or more, a corrosion preventing function can be readily imparted to the barrier layer 13. Even if the mass per unit area exceeds 0.200 g/m$^2$, there is little change in the corrosion preventing function. On the other hand, when a rare-earth oxide sol is used, heat-curing during drying may be insufficient if the coating film is thick, which may decrease the cohesive force. The thickness of the anticorrosion treatment layer 14 can be calculated from its specific gravity.

From the perspective of adhesion between the sealant layer 16 and the barrier layer 13, the anticorrosion treatment layer 14 may contain, for example, cerium oxide, 1 part by mass to 100 parts by mass of phosphoric acid or phosphate relative to 100 parts by mass of the cerium oxide, and a cationic polymer, or may be formed by applying a chemical conversion treatment to the barrier layer 13, or may contain a cationic polymer and be formed by applying a chemical conversion treatment to the barrier layer 13.

(Second Adhesive Layer)

The second adhesive layer 17 bonds the metal foil layer 13, on which the anticorrosion treatment layer 14 is formed, to the sealant layer 16. A general purpose adhesive for bonding the barrier layer 13 to the sealant layer 16 can be used as the second adhesive layer 17.

When the anticorrosion treatment layer 14 includes a layer containing at least one polymer selected from the group consisting of the cationic polymers and the anionic polymers described above, the second adhesive layer 17 preferably contains a compound (hereinafter, also referred to as a "reactive compound") having reactivity with the above-mentioned polymer contained in the anticorrosion treatment layer 14.

For example, if the anticorrosion treatment layer 14 contains a cationic polymer, the second adhesive layer 17 may contain a compound having reactivity with the cationic polymer. If the anticorrosion treatment layer 14 contains an anionic polymer, the second adhesive layer 17 may contain a compound having reactivity with the anionic polymer. Further, if the anticorrosion treatment layer 14 contains both a cationic polymer and an anionic polymer, the second adhesive layer 17 may contain a compound having reactivity with the cationic polymer and a compound having reactivity with the anionic polymer. However, the second adhesive layer 17 may not necessarily contain the above two types of compounds, but may contain a compound having reactivity with both the cationic polymer and the anionic polymer. The term "having reactivity" as described herein means forming a covalent bond with a cationic polymer or an anionic polymer. In addition, the second adhesive layer 17 may further contain an acid-modified polyolefin resin.

The compound having reactivity with the cationic polymer may be at least one compound selected from the group consisting of a polyfunctional isocyanate compound, a glycidyl compound, a compound having a carboxy group, and a compound having an oxazoline group.

The polyfunctional isocyanate compound, the glycidyl compound, the compound having a carboxy group, or the compound having an oxazoline group may be a polyfunctional isocyanate compound, a glycidyl compound, a compound having a carboxy group, a compound having an oxazoline group, or the like mentioned above, as a cross-linking agent for converting the cationic polymer into a crosslinked structure. In particular, a polyfunctional isocyanate compound is preferable from the perspective of having high reactivity with a cationic polymer and being readily formed into a crosslinked structure.

The compound having reactivity with the anionic polymer may be at least one compound selected from the group consisting of a glycidyl compound, and a compound having an oxazoline group. The glycidyl compound or the compound having an oxazoline group may be a glycidyl compound, a compound having an oxazoline group, or the like, mentioned above, as a crosslinking agent for converting the cationic polymer into a crosslinked structure. Of these compounds, the glycidyl compound is preferred from the perspective of having high reactivity with an anionic polymer.

When the second adhesive layer 17 contains an acid-modified polyolefin resin, the reactive compound is preferred to also have reactivity with the acidic group in the acid-modified polyolefin resin (i.e., form a covalent bond with the acidic group). This further enhances adhesion to the anticorrosion treatment layer 14. In addition, the acid-modified polyolefin resin is permitted to have a crosslinked structure to further improve solvent resistance of the packaging material 10.

The content of the reactive compound is preferably 1 to 10 equivalents relative to the acidic group in the acid-modified polyolefin resin. When the content is 1 or more equivalents, the reactive compound sufficiently reacts with the acidic group in the acid-modified polyolefin resin. When the content exceeds 10 equivalents, sufficient saturation is reached as a crosslinking reaction with the acid-modified polyolefin resin, and therefore unreacted substances may remain and thus various performances may deteriorate. Therefore, the content of the reactive compound is preferably, for example, 5 to 20 parts by mass (solid content ratio) relative to 100 parts by mass of the acid-modified polyolefin resin.

The acid-modified polyolefin resin is obtained by introducing an acidic group into a polyolefin resin. Examples of the acidic group include a carboxy group, a sulfonic acid group, an acid anhydride group, and the like. A maleic anhydride group and a (meth)acrylic acid group are particularly preferred. As the acid-modified polyolefin resin, for example, the same resins as a modified polyolefin resin used in the sealant layer 16 can be used.

Various additives such as flame retardants, slip agents, anti-blocking agents, antioxidants, photostabilizers, tackifiers, and the like may be added to the second adhesive layer 17.

Examples of the adhesive for forming the second adhesive layer 17 include a polyurethane resin prepared by reacting a bifunctional or higher functional isocyanate compound with a main agent such as a polyester polyol, polyether polyol, acrylic polyol, carbonate polyol, or the like, and an epoxy resin prepared by reacting an amine compound with a main agent having an epoxy group, or the like. They are preferred from the viewpoint of heat resistance.

The thickness of the second adhesive layer 17 is not particularly limited, but from the perspective of obtaining a desired adhesive strength, processability, and the like, the thickness is preferably 1 μm to 10 and more preferably 2 μm to 7 μm.

[Metal Terminals]

Figure 4:
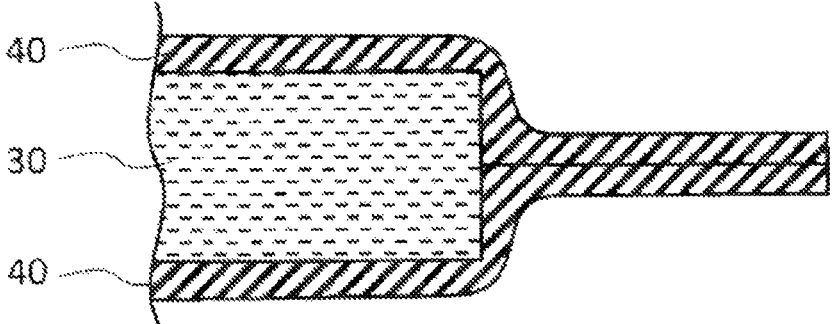
FIG. 4 is a cross-sectional view taken along the line IV-IV of FIG. 1, schematically illustrating a configuration of a tab (a terminal film and a metal terminal) of a solid-state battery.

FIG. 4 is a cross-sectional view of a terminal film and a metal terminal shown FIG. 1 taken along the line IV-IV. Of the pair of metal terminals 30, 30, one is electrically connected to the positive electrode of the power storage device main body 50 and the other is electrically connected to the negative electrode thereof. The pair of metal terminals 30, 30 extend from the power storage device main body 50 to the outside of the packaging material 10. The pair of terminals 30, 30 may each have, for example, a plate-like shape.

The metal terminals 30 may be made of a metal. The material used for the metal terminals 30 may be determined considering the structure of the power storage device main body 50, materials of the components of the power storage device main body 50, and the like. For example, if the power storage device 100 is a solid-state battery, aluminum is preferably used as a material for the metal terminal 30 connected to the positive electrode of the power storage device main body 50. As a material for the metal terminal 30 connected to the negative electrode of the power storage device main body 50, copper having a nickel-plated layer on the surface thereof, or nickel is preferably used.

The thickness of the metal terminals 30 depends on the size or capacity of the solid-state battery. If the solid-state battery is of a small size, the thickness of each metal terminal 30 may be, for example, 50 μm or more. Further, if the solid-state battery is of a large size for electrical storage or in-vehicle application, the thickness of each metal terminal 30 can be appropriately determined within the range of, for example, 100 μm to 500 μm.

[Terminal Film]

As shown in FIG. 4, the terminal film 40 is covers the outer peripheral surface of a part of the metal terminal 30. Due to the terminal film 40 being disposed between the metal terminal 30 and the packaging material 10, the sealing properties and insulation properties of the power storage device 100 can be further enhanced.

(Hydrogen Sulfide Developer)

The terminal film 40 contains a hydrogen sulfide developer that changes color upon reacting with hydrogen sulfide. Typically, as the electrolyte of the solid-state battery, a sulfide-based electrolyte, an oxide-based electrolyte, an organic polymer-based electrolyte, or the like is used. When the sulfide-based electrolyte is used, toxic hydrogen sulfide ($H_2S$) may be generated due to a reaction between sulfur and moisture infiltrated into the battery. In this case, since the terminal film 40 contains a hydrogen sulfide developer, it changes the color when the hydrogen sulfide is generated. Thus, it is possible to visually detect when hydrogen sulfide is generated. The visual detection may be performed by visual observation, or may be performed with a loupe, a microscope, or the like.

The terminal film 40 may have a monolayer configuration or multi-layer configuration. In the case of a multi-layer configuration, the hydrogen sulfide developer may be contained in one of the layers or a plurality of layers. Examples of the hydrogen sulfide developer include copper, lead, silver, manganese, nickel, cobalt, tin and cadmium. These elements may be contained in the form of metals or ions, singly or in combination. Alternatively, these elements may be contained in the form of compounds. For example, the copper may be a material containing $CuSO_4$, the lead may be a material containing $Pb(CH_3COO)_2$, or the silver may be a material containing $Ag_2SO_4$.

(Hydrogen Sulfide Deodorant)

The terminal film 40 preferably further contains a substance that decomposes or adsorbs hydrogen sulfide. When the electrolyte of the solid-state battery is a sulfide-based electrolyte, moisture infiltrating into the cell causes generation of hydrogen sulfide. Therefore, there is a concern that adhesion between the metal terminal (tab lead) 30 and the terminal film (tab sealant) 40 may decrease. As the adhesion decreases, hydrogen sulfide may leak outside, generating an odor. By adding a substance that decomposes or adsorbs hydrogen sulfide, it is possible to maintain sealing strength at room temperature and high temperature even when hydrogen sulfide is generated, and prevent generation of odor. Therefore, a substance that decomposes or adsorbs hydrogen sulfide is also a hydrogen sulfide deodorant, and hereinafter may also be referred to as a hydrogen sulfide deodorant.

Examples of the substance that decomposes or adsorbs hydrogen sulfide (hydrogen sulfide deodorant) include, but are not limited to, zinc oxide, amorphous metal silicates, hydroxides of zirconium and lanthanoid elements, tetravalent metal phosphates, potassium permanganate, sodium permanganate, aluminum oxide, iron hydroxide, silver sulfate, silver acetate, isocyanate compounds, aluminum silicate, tetravalent metal phosphates, aluminum potassium sulfate, zeolites, activated carbon, amine-based compounds and ionomers. Since the terminal film 40 contains the above hydrogen sulfide deodorant, it is possible to maintain excellent sealing strength at room temperature and high temperature even after exposure to hydrogen sulfide, and prevent generation of odor.

Figures 5A, 5B, 5C:
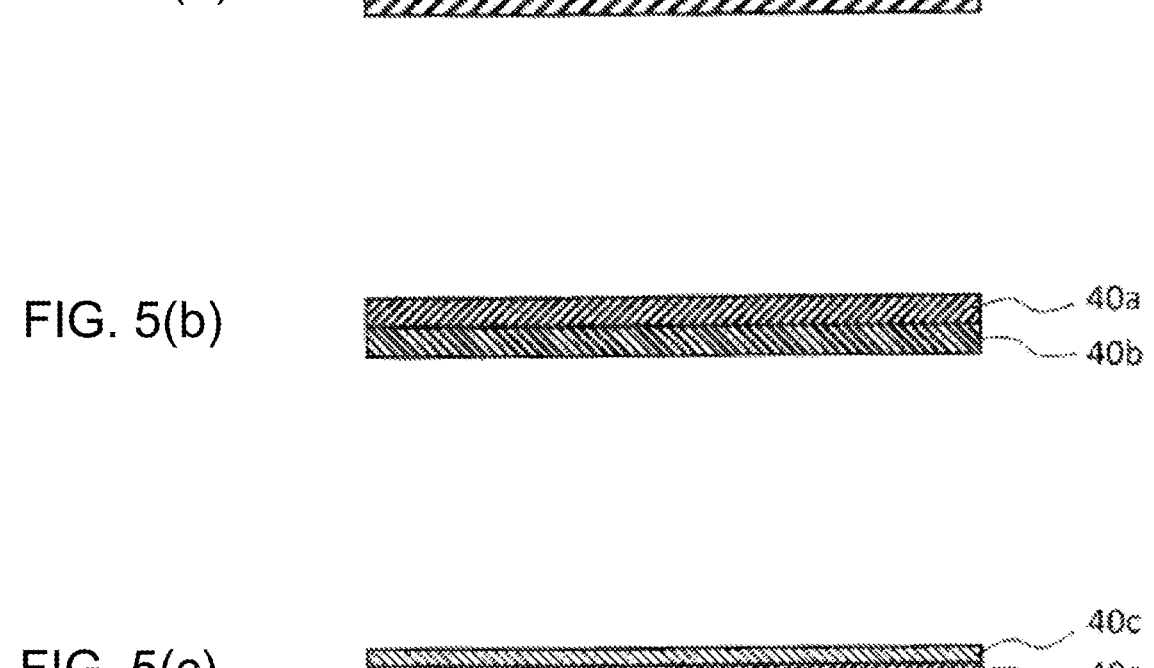
FIGS. 5(a) to 5(c) are cross-sectional views each schematically illustrating an example of a configuration of a terminal film.

In the terminal film 40, the total content of the hydrogen sulfide developer and the hydrogen sulfide deodorant in each layer is preferably 0.01% or more and 30 mass % or less relative to the mass of the terminal film 40. When the total content of the hydrogen sulfide developer and the hydrogen sulfide deodorant in each layer of the terminal film 40 is 0.01 mass % or more, the terminal film 40 can exhibit the hydrogen sulfide absorbing effect or adsorbing effect, and when it is 30 mass % or less, the terminal film 40 can have both the adhesion and the sealant suitability. If the terminal film 40 has a multi-layer structure, a layer in contact with the metal terminal 30 preferably does not contain a hydrogen sulfide developer or a hydrogen sulfide deodorant from the perspective of adhesion to the metal terminal 30. That is, a layer in contact with the packaging material 10 (for example, a resin layer 40a in FIG. 5(*b*) or resin layers 40a and 40c in FIG. 5(*c*)) preferably contains a hydrogen sulfide developer and a hydrogen sulfide deodorant. If the terminal film 40 is formed of three or more layers, an intermediate layer (for example, a resin layer 40a in FIG. 5(*c*)) preferably contains a hydrogen sulfide developer and a hydrogen sulfide deodorant.

As the resin forming the terminal film 40, polyolefin-based resins: polyethylene (LDPE, LLDPE, HDPE), polypropylene (homo, block, random), polybutene, or polyester-based resins can be used. From the perspective of heat resistance and flexibility, polypropylene is preferably used, and in particular, block polypropylene is more preferably used. Further, an acid-modified polyolefin can also be used, and examples thereof include an acid-modified polyolefin resin modified from any of an unsaturated carboxylic acid, an acid anhydride of an unsaturated carboxylic acid, and an ester of an unsaturated carboxylic acid.

Examples of the polyester-based resin include polyethylene terephthalate (PET) resin, polybutylene terephthalate (PBT) resin, polyethylene naphthalate (PEN) resin, polybutylene naphthalate (PBN) resin, and copolymers thereof. (Acid-Modified Polyolefin Resin)

The acid-modified polyolefin resin is obtained by introducing an acidic group into a polyolefin resin. Examples of the acidic group include a carboxy group, a sulfonic acid group, an acid anhydride group, and the like. A maleic anhydride group and a (meth)acrylic acid group are particularly preferred. Examples of the acid-modified polyolefin resin include a modified polypropylene-based resin such as an acid-modified polypropylene-based resin. The modified polypropylene-based resin is preferably a polypropylene-based resin graft-modified with an unsaturated carboxylic acid derivative component derived from any of an unsaturated carboxylic acid, an acid anhydride of an unsaturated carboxylic acid, and an ester of an unsaturated carboxylic acid. Examples of the polypropylene-based resin in this case include homo polypropylene, random polypropylene, and the like.

The compound used for graft-modifying these polypropylene-based resins may be an unsaturated carboxylic acid derivative component derived from any of an unsaturated carboxylic acid, an acid anhydride of an unsaturated carboxylic acid, and an ester of an unsaturated carboxylic acid.

Specifically, examples of the unsaturated carboxylic acid include acrylic acid, methacrylic acid, maleic acid, fumaric acid, itaconic acid, citraconic acid, tetrahydrophthalic acid, bicyclo[2,2,1]hept-2-ene-5,6-dicarboxylic acid, and the like.

Examples of the acid anhydride of an unsaturated carboxylic acid include maleic anhydride, itaconic anhydride, citraconic anhydride, tetrahydrophthalic anhydride, bicyclo[2,2,1]hept-2-ene-5,6-dicarboxylic acid anhydride, and the like.

Examples of the ester of an unsaturated carboxylic acid include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalic anhydride, bicyclo[2,2,1]hept-2-ene-5,6-dimethyl dicarboxylate, and the like.

The modified polypropylene-based resin can be prepared by graft polymerization (graft modification) of 0.2 to 100 parts by mass of the above unsaturated carboxylic acid derivative component relative to 100 parts by mass of a base polypropylene-based resin in the presence of a radical initiator. The reaction temperature of the graft modification is preferably 50° C. to 250° C., and more preferably 60° C. to 200° C. Further, the reaction time is appropriately set depending on the production method. For example, in the case of a melt graft polymerization using a biaxial extruder, the reaction time is preferably within the residence time of the extruder, specifically 2 min to 30 min, and more preferably 5 min to 10 min. Graft modification can be carried out under normal pressure or pressurized conditions.

The radical initiator used for graft modification may be an organic peroxide such as alkyl peroxide, aryl peroxide, acyl peroxide, ketone peroxide, peroxy ketal, peroxy carbonate, peroxy ester, or hydroperoxide.

These organic peroxides can be appropriately selected and used depending on the conditions of the reaction temperature and the reaction time described above. For example, in the case of melt graft polymerization using a biaxial extruder, it is preferred to use an alkyl peroxide, peroxy ketal, or peroxy ester. Specifically, it is preferred to use di-t-butyl peroxide, 2,5-dimethyl-2,5-di-t-butyl peroxyhexyne-3, dicumyl peroxide, or the like.

Specifically, for example, the following products can be used, and acid-modified maleic acid is preferably used.

Maleic anhydride: Admer (Mitsui Chemicals, Inc.), Modic (Mitsubishi Chemical Corporation), Toyo-Tac (Toyobo Co., Ltd.), SANSTACK (Sanyo Chemical Industries, Ltd.).

As described above, the terminal film 40 has a monolayer structure or a multi-layer structure. When the terminal film 40 has a monolayer structure, the terminal film 40 is formed of the resin layer 40a (see FIG. 5(*a*)). When the terminal film 40 has a multi-layer structure, the terminal film 40 may include at least one resin layer (resin layer 40a) that satisfies the above conditions (see FIGS. 5(b) and 5(c)). Further, when the terminal film 40 is a multi-layer structure, all the layers are preferably formed of the same type of resin material from the perspective of adhesion between adjacent layers.

The thickness of the terminal film 40 is preferably 15 μm or more, more preferably 30 μm to 300 and still more preferably 50 μm to 200 μm from the perspective of embedding properties and insulating properties. Since the terminal film 40 includes the resin layer having the above composition, the terminal film 40 can visually indicate when hydrogen sulfide is generated and prevent generation of odor.

The terminal film 40 contains an additive as necessary. Examples of the additive include a plasticizer, an antioxidant, a slip agent, a flame retardant, an AB agent, a photostabilizer, a dehydrating agent and a tackifier.

Although some embodiments of the present disclosure have been specifically described above, the present invention is not limited to the above embodiment and can be modified or changed in various ways within the spirit of the present disclosure recited in the claims.

For example, in the above embodiment, the anticorrosion treatment layer 14 is provided only on one surface (a surface facing the second adhesive layer 17) of the barrier layer 13. However, the anticorrosion treatment layer 14 may also be provided on the other surface (a surface facing the first adhesive layer 12) of the barrier layer 13. Further, for example, when the sealant layer 16 is bonded to the barrier layer 13 by thermal lamination, the second adhesive layer 17 may be omitted. When the substrate layer 11 is provided by application or coating, the first adhesive layer 12 may be omitted. In the above embodiment, a solid-state battery is illustrated as the power storage device to which the packaging material 10 is applied. However, the packaging material 10 may also be applied to other power storage devices (for example, lithium ion batteries).

EXAMPLES

The present disclosure will be described below in more detail by way of examples. However, the present disclosure should not be limited to the following examples.

[Materials Used]

The following materials were prepared to produce terminal films according to the examples and the comparative examples.

<Resin Materials>

Resin A: a blend of block polypropylene (Novatec-PP, manufactured by Japan Polypropylene Corporation) and maleic anhydride-modified polyolefin (Toyo-Tac, Toyobo Co., Ltd.)

Resin B: block polypropylene (Novatec-PP, manufactured by Japan Polypropylene Corporation)

Resin C: a blend of random polypropylene (F744NP, manufactured by Prime Polymer Co., Ltd.) and maleic anhydride-modified polyolefin (Toyo-Tac, Toyobo Co., Ltd.)

<Developers>

In the examples, the following developers a to c were added to each layer of the terminal film. Table 1 shows the presence or absence of addition and the compounded amount. The compounded amount represents the ratio (mass %) relative to the total amount (100 mass %) of each layer. The developer was used by mixing with the materials constituting each layer.

Developer a: Lead acetate (Pb(CH_3COO)_2)

Developer b: Copper sulfate (CuSO_4)

Developer c: Silver sulfate (Ag_2SO_4)

<Hydrogen Sulfide (H_2S) Deodorants>

In some examples and the comparative examples, the following hydrogen sulfide deodorants A to C were added to each layer. Table 1 shows the presence or absence of addition and the compounded amount. The compounded amount represents the ratio (mass %) relative to the total amount (100 mass %) of each layer. The hydrogen sulfide deodorant was used by mixing with the materials constituting each layer.

Hydrogen sulfide deodorant A: Zinc oxide (ZnO, white pigment)

Hydrogen sulfide deodorant B: DAIMUSHEW PE-M 3000-Z, polyethylene masterbatch product (manufactured by Dainichiseika Color & Chemicals Mfg. Co., Ltd.)

Hydrogen sulfide deodorant C: KESUMON NS10C (manufactured by Toagosei Co., Ltd.)

<Layer Configuration>

Monolayer: Monolayer configuration of resin A (Examples 1 to 11, Comparative Examples 1 and 2)

Multi-layer: Three-layer configuration of resin C/resin B/resin C (Examples 12 and 13)

Table 1 shows the thickness of each layer.

[Evaluation Method]

(Preparation of Samples)

Figure 6:
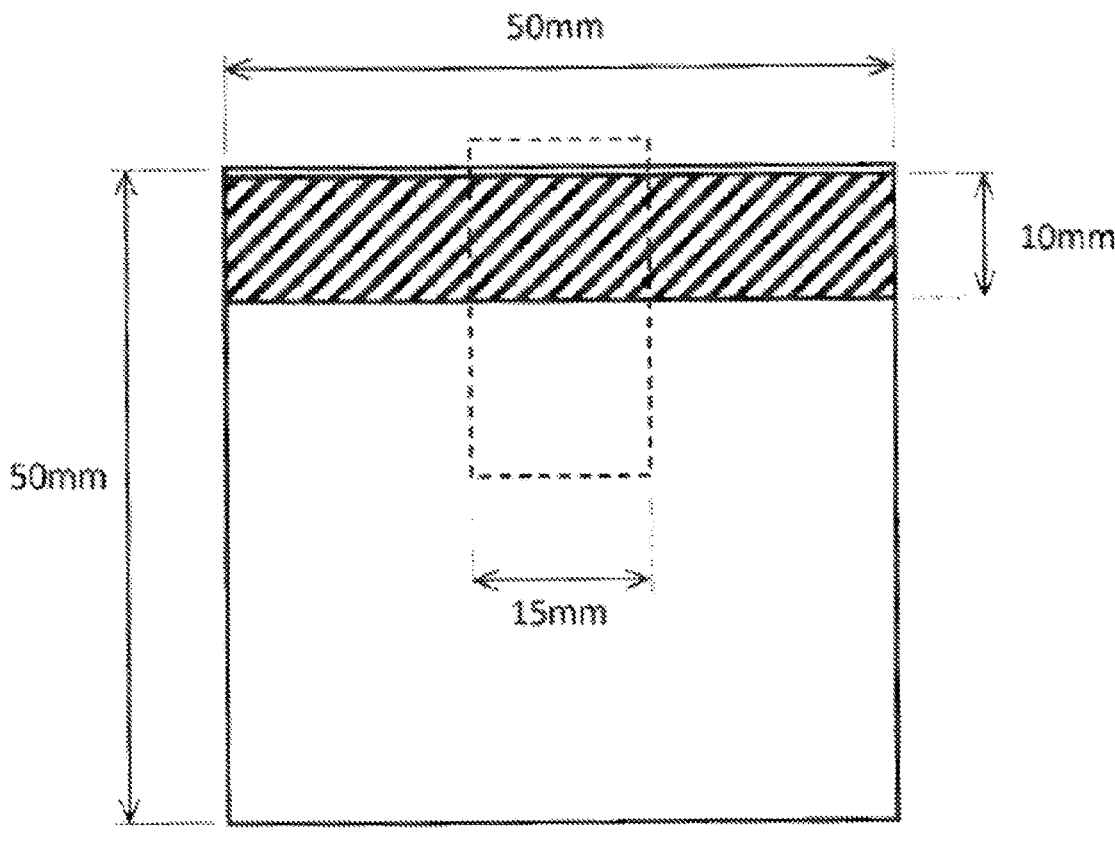
FIG. 6 is a plan view schematically illustrating evaluation samples prepared in examples and comparative examples.

As a sample of each example using the above resin material, a terminal film sample cut to 50 mm (TD)×100 mm (MD) was prepared and folded in half on a chemical conversion-treated AL cut to 50 mm×50 mm, and heat-sealed at one side with a seal bar with a width of 10 mm at 165° C. and 0.6 MPa for 10 sec. Then, the heat-sealed portion was cut to a width of 15 mm. See FIG. 6 for the approximate shape of the sample.

<Initial Sealing Strength>

The sealing strength was measured at room temperature (23° C.) at a peeling speed of 50 mm/min. Based on the results, assessments were given by the following criteria. Table 1 shows the results.

A: Burst strength was 20 N/15 mm or more.

B: Burst strength was 15 N/15 mm or more and less than 20 N/15 mm.

C: Burst strength was less than 15 N/15 mm.

<Hydrogen Sulfide Development>

If a change of the color was visually observed in a container containing 2 L of 5 ppm H2S after 72 h at room temperature, it was judged as a pass.

Specifically, a terminal film sample was cut to 50 mm×50 mm, and placed in a 2 L Tedlar bag and sealed. 2 L of 5 ppm H_2S gas was introduced into the Tedlar bag containing the sample, which in turn was left at room temperature for 72 h to check a change of the color of the terminal film.

<Hydrogen Sulfide Absorption>

If a concentration became 10 ppm or less in a container containing 2 L of 20 ppm H2S after 144 h at room temperature, it was judged as a pass.

Specifically, a terminal film sample was cut to 50 mm×50 mm, and placed in a 2 L Tedlar bag and sealed. 2 L of 20 ppm H_2S gas was introduced into the Tedlar bag containing the sample, which in turn was left at room temperature for 144 h to determine a concentration in the container. 10 ppm or less and 5 ppm or more was graded as "fair," and 5 ppm or less was graded as "good." "Fair" and "good" were judged as a pass.

Example 1

A terminal resin film (monolayer, thickness: 100 μm) made of the following resin composition was prepared by an inflation method.
  Resin: resin A
  Hydrogen sulfide developer: 0.1% of developer a was added.

Example 2

A terminal resin film (monolayer, thickness: 100 μm) made of the following resin composition was prepared by an inflation method.
  Resin: resin A
  Hydrogen sulfide developer: 0.3% of developer a was added.

Example 3

A terminal resin film (monolayer, thickness: 100 μm) made of the following resin composition was prepared by an inflation method.
  Resin: resin A
  Hydrogen sulfide developer: 3% of developer a was added.

Example 4

A terminal resin film (monolayer, thickness: 100 μm) made of the following resin composition was prepared by an inflation method.
  Resin: resin A
  Hydrogen sulfide developer: 10% of developer a was added.

Example 5

A terminal resin film (monolayer, thickness: 100 μm) made of the following resin composition was prepared by an inflation method.
  Resin: resin A
  Hydrogen sulfide developer: 30% of developer a was added.

Example 6

A terminal resin film (monolayer, thickness: 100 μm) made of the following resin composition was prepared by an inflation method.
  Resin: resin A
  Hydrogen sulfide developer: 3% of developer b was added.

Example 7

A terminal resin film (monolayer, thickness: 100 μm) made of the following resin composition was prepared by an inflation method.
  Resin: resin A
  Hydrogen sulfide developer: 3% of developer c was added.

Example 8

A terminal resin film (monolayer, thickness: 100 μm) made of the following resin composition was prepared by an inflation method.
  Resin: resin A
  Hydrogen sulfide developer: 1% of developer a was added.

Hydrogen sulfide deodorant: 3% of hydrogen sulfide deodorant A was added.

Example 9

A terminal resin film (monolayer, thickness: 100 μm) made of the following resin composition was prepared by an inflation method.
  Resin: resin A
  Hydrogen sulfide developer: 3% of developer a was added.
  Hydrogen sulfide deodorant: 10% of hydrogen sulfide deodorant A was added.

Example 10

A terminal resin film (monolayer, thickness: 100 μm) made of the following resin composition was prepared by an inflation method.
  Resin: resin A
  Hydrogen sulfide developer: 0.1% of developer a was added.
  Hydrogen sulfide deodorant: 3% of hydrogen sulfide deodorant A was added.

Example 11

A terminal resin film (monolayer, thickness: 100 μm) made of the following resin composition was prepared by an inflation method.
  Resin: resin A
  Hydrogen sulfide developer: 50% of developer a was added.

Example 12

A terminal resin film having a three-layer structure (25 μm/50 μm/25 μm) was prepared by an inflation method.
  Layer on the packaging material-side: 0.3% of developer a was added to resin C.
  Intermediate layer: 3% of hydrogen sulfide deodorant A was added to resin B.
  Layer on the metal terminal-side: resin C

Example 13

A terminal resin film having a three-layer structure (25 μm/50 μm/25 μm) was prepared by an inflation method.
  Layer on the packaging material-side: 0.3% of developer a and 3% of hydrogen sulfide deodorant A were added to resin C.
  Intermediate layer: 3% of hydrogen sulfide deodorant A was added to resin B.
  Layer on the metal terminal-side: resin C

Comparative Example 1

Comparative example 1 was the same as Example 1 except that no hydrogen sulfide developer was added.

Comparative Example 2

Comparative example 2 was the same as Example 1 except that no hydrogen sulfide developer was added and 3% of hydrogen sulfide deodorant A was added.
  Table 1 shows the assessment results of the above examples and comparative examples.

TABLE 1

| Notes | Monolayer (100 μm) | | | | | Three-layer configuration (100 μm in total) | | | | | | | | | | | | | | | Initial sealing strength | Development | H₂S absorption |
|---|---|---|---|---|---|---|---|---|---|---|---|---|---|---|---|---|---|---|---|---|---|---|---|
| | | | | | | Front side (farther from lead) | | | | | Core | | | | | Rear side (rear; lead-side) | | | | | | | |
| | Thickness μm | Developer | | Deodorant | | Thickness μm | Developer | | Deodorant | | Thickness μm | Developer | | Deodorant | | Thickness μm | Developer | | Deodorant | | | | |
| | | Material | Compounded Amount | Material | Compounded Amount | | Material | Compounded Amount | Material | Compounded Amount | | Material | Compounded Amount | Material | Compounded Amount | | Material | Compounded Amount | Material | Compounded Amount | | | |
| Example 1 | 100 | a | 0.1% | | | | | | | | | | | | | | | | | | A | good | fair |
| Example 2 | 100 | a | 0.3% | | | | | | | | | | | | | | | | | | A | good | fair |
| Example 3 | 100 | a | 3% | | | | | | | | | | | | | | | | | | A | good | good |
| Example 4 | 100 | a | 10% | | | | | | | | | | | | | | | | | | B | good | good |
| Example 5 | 100 | a | 30% | | | | | | | | | | | | | | | | | | B | good | good |
| Example 6 | 100 | b | 3% | | | | | | | | | | | | | | | | | | A | good | good |
| Example 7 | 100 | c | 3% | | | | | | | | | | | | | | | | | | A | good | good |
| Example 8 | 100 | a | 1% | A | 3% | | | | | | | | | | | | | | | | A | good | good |
| Example 9 | 100 | a | 3% | A | 10% | | | | | | | | | | | | | | | | B | good | good |
| Example 10 | 100 | a | 0.1% | A | 3% | | | | | | | | | | | | | | | | A | good | good |
| Example 11 | 100 | a | 50% | | | | | | | | | | | | | | | | | | C | good | good |
| Example 12 | | | | | | 25 | a | 0.3% | | | 50 | | | A | 3% | 25 | — | | — | | A | good | good |
| Example 13 | | | | | | 25 | a | 0.3% | A | 3% | 50 | | | A | 3% | 25 | — | | — | | A | good | good |

TABLE 1-continued

| | Monolayer (100 µm) | | | | Three-layer configuration (100 µm in total) | | | | | | | | | | | | | | | | | | Initial sealing strength | Development | H$_2$S absorption |
| | Developer | | Deodorant | | Front side (farther from lead) | | | | | Core | | | | | Rear side (rear: lead-side) | | | | | | | | | | |
| | | | | | | Developer | | Deodorant | | | Developer | | Deodorant | | | Developer | | Deodorant | | | | | | |
| Notes | Thickness µm | Material | Compounded Amount | Material | Compounded Amount | Thickness µm | Material | Compounded Amount | Material | Compounded Amount | Thickness µm | Material | Compounded Amount | Material | Compounded Amount | Thickness µm | Material | Compounded Amount | Material | Compounded Amount | | | | | |
| Comp. example 1 | 100 | — | — | — | | | | | | | | | | | | | | | | | | A | poor | poor |
| Comp. example 2 | 100 | — | — | A | 3% | | | | | | | | | | | | | | | | | A | poor | good |

INDUSTRIAL APPLICABILITY

According to the terminal film for a power storage device of the present disclosure, the color of the terminal film changes upon generation of hydrogen sulfide. Accordingly, abnormality of the solid-state battery can be detected by visual observation at an early stage.

[Reference Signs List] 10 . . . Packaging material; 11 . . . Substrate layer; 12 . . . First adhesive layer; 13 . . . Barrier layer; 14 . . . Anticorrosion treatment layer; 16 . . . Sealant layer; 17 . . . Second adhesive layer; 30 . . . Metal terminal; 40 . . . Terminal film; 50 . . . Power storage device main body; 100 . . . Power storage device.

What is claimed is:

1. A terminal film for a power storage device configured to cover an outer peripheral surface of a part of a metal terminal of the power storage device composed of a power storage device main body and the metal terminal electrically connected to the power storage device main body, the terminal film comprising a first material that changes color upon reacting with hydrogen sulfide, wherein the terminal film is a monolayer and wherein a content of the first material in the monolayer is 3% or more and 30% or less relative to a mass of the monolayer.

2. The terminal film for a power storage device of claim 1, wherein the first material contains at least one element selected from the group consisting of copper, lead, silver, manganese, nickel, cobalt, tin and cadmium.

3. The terminal film for a power storage device of claim 1, wherein the first material (hydrogen sulfide developer) is a material containing at least one selected from the group consisting of $CuSO_4$, $Pb(CH_3COO)_2$ and $Ag_2SO_4$.

4. The terminal film for a power storage device of claim 1, further comprising a second material having at least one of decomposition capability and adsorption capability for hydrogen sulfide.

5. The terminal film for a power storage device of claim 4, wherein the second material comprises at least one of zinc oxide and zinc ions.

6. The terminal film for a power storage device of claim 1, wherein the terminal film consists of the first material and a resin.

7. The terminal film for a power storage device of claim 6, wherein the resin is a polyolefin resin.

8. The terminal film for a power storage device of claim 4, wherein the terminal film consists of the first material, the second material and a resin.

9. The terminal film for a power storage device of claim 8, wherein the resin is a polyolefin resin.

10. A terminal film for a power storage device configured to cover an outer peripheral surface of a part of a metal terminal of the power storage device composed of a power storage device main body and the metal terminal electrically connected to the power storage device main body, the terminal film consisting of:

a resin and a first material that changes color upon reacting with hydrogen sulfide.

11. The terminal film for a power storage device of claim 10, wherein the first material contains at least one element selected from the group consisting of copper, lead, silver, manganese, nickel, cobalt, tin and cadmium.

12. The terminal film for a power storage device of claim 10, wherein the first material is a material containing at least one selected from the group consisting of $CuSO_4$, $Pb(CH_3COO)_2$ and $Ag_2SO_4$.

13. The terminal film for a power storage device of claim 10, wherein the resin is a polyolefin resin.

* * * * *